United States Patent [19]
Sansone et al.

[11] Patent Number: 6,006,211
[45] Date of Patent: Dec. 21, 1999

[54] METERING INCOMING DELIVERABLE MAIL TO IDENTIFY DELIVERY DELAYS

[75] Inventors: Ronald P. Sansone, Weston; Robert B. McFiggans, Stamford, both of Conn.

[73] Assignee: Pitney Bowes Inc., Stamford, Conn.

[21] Appl. No.: 08/924,793

[22] Filed: Sep. 5, 1997

[51] Int. Cl.[6] .................................................. G06F 17/00
[52] U.S. Cl. ........................ 705/410; 705/400; 705/401; 705/416
[58] Field of Search .................................. 705/400, 401, 705/412; 382/101

[56] References Cited

U.S. PATENT DOCUMENTS

| | | | |
|---|---|---|---|
| 4,637,051 | 1/1987 | Clark | 382/101 |
| 4,787,045 | 11/1988 | Storace et al. | 705/403 |
| 5,790,790 | 8/1998 | Smith et al. | 395/200.36 |
| 5,796,834 | 8/1998 | Whitney et al. | 705/401 |

*Primary Examiner*—Emanuel Todd Voeltz
*Assistant Examiner*—Thomas A. Dixon
*Attorney, Agent, or Firm*—Ronald Reichman; Melvin J. Scolnick

[57] ABSTRACT

A system that allows a third party, such as a postage meter manufacturer or PSD manufacturer, to collate data, process the data and report localized delivery delays on a nationalized basis. The foregoing is accomplished by connecting a scanner and control software to a digital postage meter or PSD processor that would read incoming digitally metered mail. Instead of printing an indicia, the scanner would read the already existing indicia and other information on the mail piece and then extract the sender data fields that are contained in the indicia or on the mail piece. The extracted mail data would be periodically uploaded to a data center. The data center would compare the extracted data with mail sender data that has previously been uploaded from sending meters and processors to determine unexpected delivery delays in the delivery network.

28 Claims, 11 Drawing Sheets

Date: 06/19/00

CITY 4 MAILER REPORT

| From City | % Direct Links(*) | Delivery Transit Variance time variance in hours (from last 30 day average) |
|---|---|---|
| CITY 1 | | |
| ZIP A | 90% | +2 |
| ZIP B | 84% | -6 |
| ZIP C | 86% | +3 |
| CITY 2 | | |
| ZIP D | 79% | +44 |
| ZIP F | 79% | -1 |
| CITY 3 | | |
| ZIP G | 62% | +21 |
| ZIP H | 62% | +2 |

FIG. 10

METERING INCOMING DELIVERABLE MAIL TO IDENTIFY DELIVERY DELAYS

CROSS REFERENCE TO RELATED APPLICATIONS

Reference is made to commonly assigned co-pending patent application Ser. No. 08/924,668 filed herewith entitled "Metering Incoming Deliverable Mail" in the names of Robert McFiggans and Ronald Sansone and Ser. No. 08/924,789 entitled "Metering Incoming Deliverable Mail To Determine Fraudulent Indicia" in the names of Ronald Sansone and Robert McFiggans; and application Ser. No. 08/924,860 filed herewith entitled "Metering Incoming Deliverable Mail To Automatically Enable Address Correction" in the names of Ronald Sansone and Robert McFiggans.

FIELD OF THE INVENTION

The invention relates generally to the field of messaging systems and, more particularly, to messaging systems that utilize postage meters and a centralized or distributed data processing center.

BACKGROUND OF THE INVENTION

For the past 150 years, regional postal services have evolved complex networks for delivering mail to recipients. With the advent of computer technology, logistical solutions have been developed and utilized to manage and attempt to optimize the time to deliver the mail. In spite of the sophisticated techniques developed heretofore, from time to time quantities of mail experience delivery delays. Currently, there exists no adequate system that informs the mailer of delivery delays. Consequently, mailers sometimes send additional mailings, such as dunning notices, to recipients in response to tardy or late responses caused by the carrier. The foregoing may cause additional expense and/or embarrassment to the mailer.

Historically, postage meters have been mechanical and electromechanical devices that maintain, through mechanical or "electronic registers" (postal security devices), an account of all postage printed and the remaining balance of prepaid postage and print postage postmarks (indicia) that are accepted by the postal service as evidence of the prepayment of postage.

Soon, small business mailers may be able to use their desktop computer and printer to apply postage directly onto envelopes or labels while applying an address. The United States Postal Service Engineering Center recently published a notice of proposed specification that may accomplish the foregoing. The title of the specification is Information-Based Indicia Program Postal Security Device Specification, dated Jun. 13, 1996, herein incorporated by reference. The Information-Based Indicia Program specification includes both proposed specifications for the new indicium and proposed specifications for a postal security device (PSD). The proposed Information-Based Indicia (IBI) consists of a two dimensional bar code containing hundreds of bytes of information about the mail piece and certain human-readable information. The indicium includes a digital signature to preclude the forgery of indicia by unauthorized parties. The postal security device is a security device that produces a cryptographic digital signature for the indicium and performs the function of postage meter registers.

There are approximately one and a half million postage meters in use in the United States. The IBIP is a United States Postal Service initiative supporting the development and implementation of a new form of postal indicia.

SUMMARY OF THE INVENTION

This invention overcomes the disadvantages of the prior art by providing a system that allows a third party, such as a postage meter manufacturer or PSD manufacturer, to collate data, process the data and report localized delivery delays on a nationalized basis. The apparatus of this invention may be utilized by organizations or people who mail invoices, bills, letters, or other items for timely responses by recipients of the mailings. If the recipient fails to respond to the mailing in a specified period of time, the original mailer may assume that the recipient has not replied to the mailing. At this point the original mailer may take certain preplanned actions, i.e., send a nasty letter to the recipient, notify a third party of the recipients delay etc. This invention provides new information to the original mailer to allow the mailer to selectively delay mailed responses to the recipient's failure to reply because of identified delays in the delivery of the mailers mail. Premature replies to recipient delayed delivery responses may cause mailers embarrassment and the expenditure of unneeded funds.

The foregoing is accomplished by connecting a scanner and control software to a digital postage meter or PSD that would read incoming digitally metered mail. Instead of printing an indicia, the scanner would read the already existing indicia and other information on the mail piece and then extract the sender data fields that are contained in the indicia or on the mail piece. The extracted mail data would be periodically uploaded to a data center. The data center would compare the extracted data with mail sender data that has previously been uploaded from sending meters and processors to determine unexpected delivery delays in the delivery network.

In essence, originating mail processors would upload pertinent mail piece information on addressees, pointers or other identifiers automatically and periodically to a data center. The recipient addressee of the mail piece would temporarily configure his digital postage meter or PSD as a mail receiver so that the postage meter or PSD would read the digital indicia that was affixed to the currently delivered incoming mail. The incoming mail would be date/time stamped, opened (optionally) and the unique identifier that was placed in the postal indicia would be read. The recipient meter or PSD would periodically upload to the data center raw data on the unique identifiers or codes that have been received. If the received unique identifiers or codes match with the sender unique identifiers or codes in a reasonable amount of time, as would normally be the case, the sent and received codes cancel out, or are kept for statistical information on delivery times, etc. Variations from the expected transit time would be captured, with reports being generated and sent to the mailer as needed or as requested.

BRIEF DESCRIPTION OF THE DRAWINGS

FIG. 10 is a individual customers daily delivery report.

DETAILED DESCRIPTION OF THE PREFERRED EMBODIMENT

Figure 1:
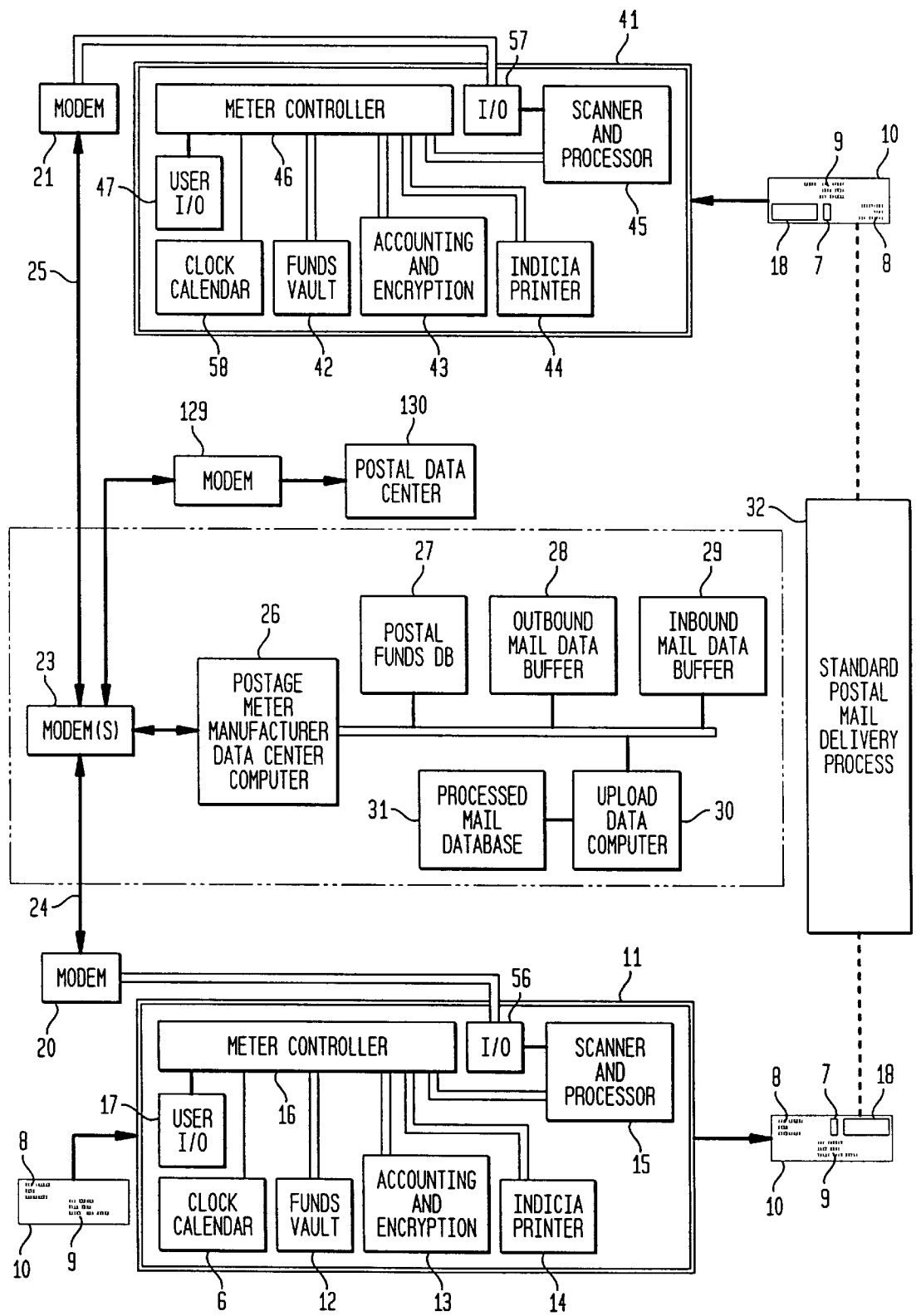
FIG. 1 is a block diagram of this invention.

Referring now to the drawings in detail, and more particularly to FIG. 1, the reference character 11 represents a electronic postage meter. Postage meter 11 includes: a funds vault 99, that represents the value of the postage that may be used by meter 11; an accounting and encryption module 13, that contains information that is used to print indicia 18; a printer 14; a scanner and processor 15; a controller 16; a clock and calendar 6; a user I/O 17, and a I/O 56. Accounting and encryption module 13 obtains a security code that may be obtained from address field 9 of mail piece 10 and information contained in postage meter 11. The manner in which the aforementioned security code is obtained is disclosed in the Sansone et al U.S. Pat. No. 4,831,555 entitled "Unsecured Postage Applying System" herein incorporated by reference. User I/O 17 comprises a keyboard in which an operator may enter information into meter 11 and a display in which a operator of meter 11 may read information about meter 11. Funds vault 99, accounting and encryption module 13, indicia printer 14, scanner and processor 15, clock and calendar 6, and user I/O 17 are coupled to controller 16. Clock and calendar 6 provides an internal source of time and date for controller 16. Thus, clock and calendar 6 will supply the instant date and time that meter 11 affixed the indicia to mail piece 10. Scanner and processor 15 will store the above information in buffer 54 (described in the description of FIG. 2).

Actions performed by meter 11 are communicated to controller 16. Controller 16 controls the actions of postage meter 11. Clock and calendar 6 also permit controller 16 to store the date and time that postal indicia 18 was affixed to mail piece 10. Controller 16 uses the weighing of the mail piece to determine the correct postage, and causes meter 11 to affix the correct postage to the mail piece. Controller 16 is described in Wu's U.S. Pat. No. 5,272,640 entitled "Automatic Mail-Processing Device With Full Functions", herein incorporated by reference.

The user of meter 11 places the mail piece to be mailed on a scale (not shown) and enters the classification of the material to be mailed, i.e., first class mail, second class mail, parcel post, etc. into the keyboard of I/O 17 and relevant information regarding the object to be mailed is displayed on the display of I/O 17.

Printer 14 will print postal indicia 18 on mail piece 10. Scanner and processor 15 scans address field 9 and sender return address field 8 of mail piece 10. Then scanner and processor 15 segments the information contained in fields 8 and 9 and stores the segmented information, i.e., tracking code 7. Tracking code 7 may be similar to or the same as the security code determined by accounting encryption module 13. For instance, a unique tracking number may be composed by assembling a number that includes the meter number, the date of mailing of the mail piece, the time of day, the postage placed on the mail piece, the zip code of the licensee of the meter, the name, address, city, state and zip code of the sender of the mail piece and the name address, city, state and zip code of the recipient of the mail piece. It will be obvious to one skilled in the art that any combination of the aforementioned variables may be used if the meter number is included. In the United States, meter manufacturers identify their meters by one or two alpha characters before the meter number. It will also be obvious to one skilled in the art that many other variables may be used to produce unique tracking numbers.

I/O 56 is coupled to modem 20 and scanner and processor 15. Modem 23 is coupled to modem 20 via communications path 24 and modem 21 is coupled to modem 23 via communications path 25. Modem 23 is coupled to postage meter data center computer 26. Computer 26 manages the day to day operation of its postage meters metering i.e., installing new postage meters, withdrawing postage meters, and refilling postage meters with customer funds.

Computer 26 is coupled to postal funds data base 27. Data base 27 stores postal funds that have been used and credited to meters 11 and 41. Outbound mail data buffer 28 receives information about mail piece 10 from postage meter 11, i.e., tracking number 7 and address field 9. Inbound mail buffer 29 receives information about mail piece 10 from postage meter 41, i.e., tracking number 7 and address field 9. Upload data computer 30 receives and processes information from buffers 28 and 29. Processed mail data base 31 is coupled to upload data computer 30. Processed mail data base 31 stores the result of the output of computer 30 and makes it available to computer 26 for transmission to meter 11.

Postage meter 41 includes: a funds vault 42, that represents the value of the postage that may be used by meter 41; an accounting and encryption module 43, that contains information that is used to print postal indicia; a printer 44; a scanner and processor 45; a controller 46; a clock and calendar 58 that permits controller 46 to store the date and time that scanner 45 scanned mail piece 10; a user I/O 47; and a I/O 57. Funds vault 42, accounting and encryption module 43; indicia printer 44; scanner and processor 45; and user I/O 47 are coupled to controller 46. I/O 57 is the interface between scanner and processor 45 and modem 21 and is used to upload data from meter 41 to computer 26 via modems 21 and 23. Clock and calendar 58 will supply the instant date and time that scanner 45 reads mail piece 10. The above information will be stored in buffer 54 of FIG. 2.

Thus, meter 41 is the same as meter 11. In this example, meter 41 is being used as the receiving meter and meter 11 is being used as a sending meter. It will be obvious to those skilled in the art that meter 11 may be a receiving meter and meter 41 a sending meter and that additional meters may be connected to computer 26. Modem 23 is coupled to modem 129 which is coupled to postal data center 130 so that information from upload data computer 30 may be transmitted to postal data center 130. Upload data computer 30 may inform postal data center 130 of unexpected delivery delays in the mail delivery network and charge the mailer and/or the post for informing the mailer of the unexpected delivery delays in the mail delivery network.

After indicia 18 is affixed to mail piece 10 by postage meter 11, mail piece 10 is delivered to the post and enters USPS mail delivery process 32. The post delivers mail piece 10 to the owner of electronic postage meter 41. Mail piece 10 will be scanned by scanner and processor 45 of meter 41.

Scanner and processor 45 segments the data and stores it for uploading to computer 26 via modems 21 and 23. Information from meter 11 regarding mail piece 10 was previously sent to computer 26 via modems 20 and 23. The information transmitted by meter 11 is tracking number 7, address field 8 and address field 9. The information transmitted by meter 41 is tracking number 7, return address field 8 and address field 9, the date and time mail piece 10 was scanned by meter 41 and the serial number of meter 41. It would be obvious to one skilled in the art that information transmitted between meter 11 and computer 26 and information transmitted between meter 46 and computer 26 may be encrypted to ensure the privacy of the information.

Figure 2:
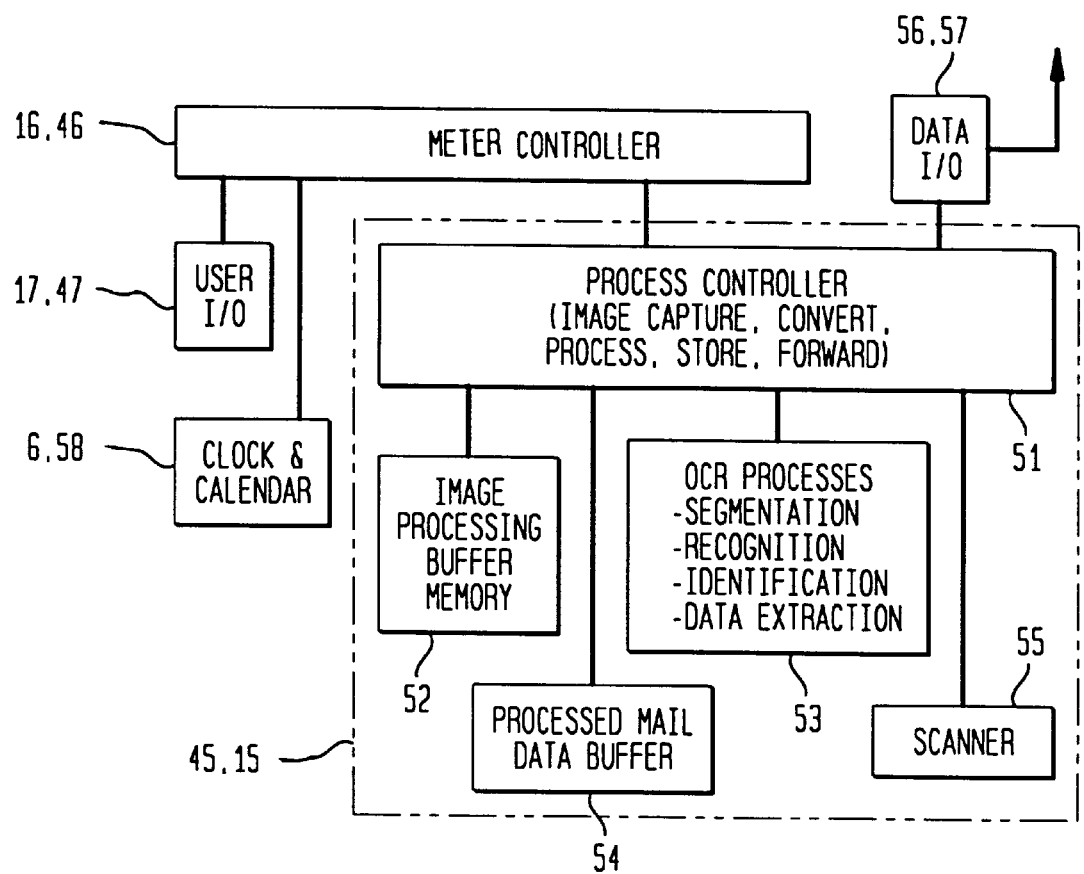
FIG. 2 is a drawing of scanner and data processors 15 and 45 of FIG. 1 in greater detail.

FIG. 2 Is a drawing of scanner and data processors 15 and 45 of FIG. 1 in greater detail. The operator of meter 41 may use I/O 47 to select the meter mode to place a postal indicia on mail piece 10 or the scan mode to read the postal indicia on mail piece 10. When the operator of meter 41 selects the scan mode, controller 46 turns control of meter 41 over to scan process controller 51. Mail piece 10 will be moved under scanner 55 and transported through meter 41 (not shown). Scanner 55 will store the image of mail piece 10 in buffer 52, convert the image by using the process mentioned in block 53 and store the processed image in processed mail data buffer 54. Then the optical character recognition process 53 will begin. Process 53 will segment the image into its various components, i.e., amount of postage, meter number, date mail piece 10 mailed, place mail piece 10 mailed, security code 89, tracking number 7, recipient address 9, and return address 8, etc. At this point, a recognition process will take the segmented components of the aforementioned image and convert them into an ASCII text field. In the identification process, it will be determined whether or not the ASCII information is in the correct format. Now the extracted information will be placed in processed mail data buffer 54. Clock and calendar 58 will be used to determine when mail piece 10 was scanned and I/O 57 will be used to convey the information stored in buffer 54 to modem 21 at predetermined times.

The operator of meter 11 may use I/O 17 to select the meter mode to place a postal indicia on mail piece 10 or the scan mode to read the postal indicia on mail piece 10. When the operator of meter 11 selects the meter mode, controller 16 turns control of meter 11 over to meter process controller 51. While mail piece 10 is being printed it is scanned by scanner 55.

Scanner 55 will store the image of mail piece 10 in buffer 52 while mail piece 10 is being printed by meter 11. Scanner 55 will also convert the image by using the process shown in block 53 and store the processed image in mail data buffer 54. Then the optical character recognition process 53 will begin. Process 53 will segment the image into its various components, i.e., amount of postage, meter number, date mail piece 10 mailed, place mail piece 10 mailed, security code 89, tracking number 7, 6, recipient address 9, and return address 8, etc. At this point, the recognition process will take the segmented components of the aforementioned image and convert them into an ASCII text field. In the identification process, it will be determined whether or not the ASCII information is in the correct format. Now the extracted information will be placed in processed mail data buffer 54. Clock and calendar 6 will be used to note when an indicia was affixed to mail piece 10 and when mail piece 10 was scanned. I/O 56 will be used to convey the information stored in buffer 54 to modem 20 at a predetermined time.

Figure 3:
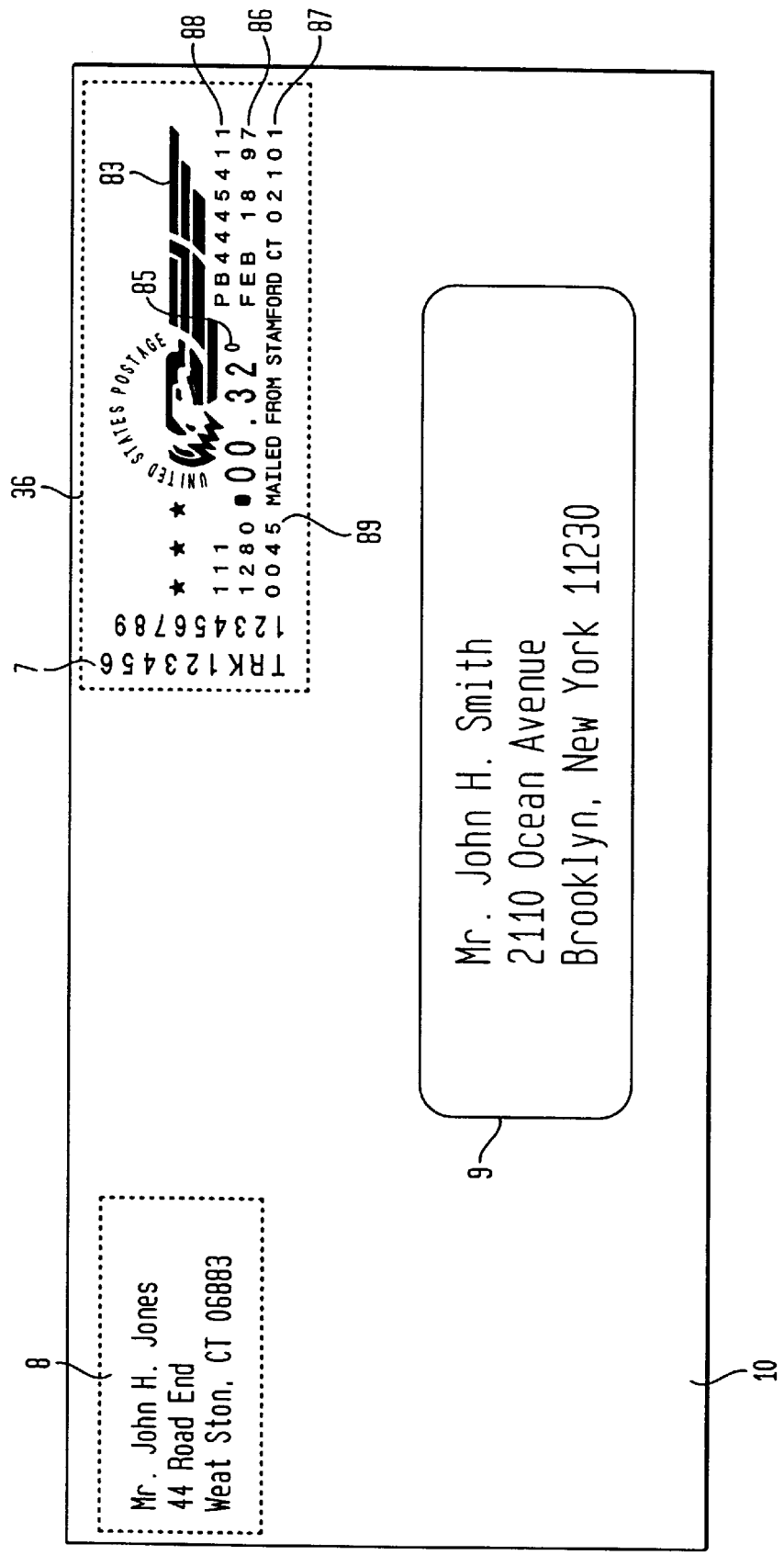
FIG. 3 is a drawing of a mail piece containing a postal indicia that was affixed by a electronic meter.

FIG. 3 is a drawing of a mail piece containing a postal indicia that was affixed by a electronic meter. Mail piece 10 has a recipient address field 9 and a sender address field 8. A postal indicia 36 is affixed to mail piece 10. Indicia 36 contains a dollar amount 85, the date 86, that postal indicia 36 was affixed to mail piece 10, the place 87 that mail piece 10 was mailed, the postal meter serial number 88, an eagle 83, a security code 89 and a tracking number 7. Security code 89 and tracking number 7 are unique numbers that are derived from address field 9 and information contained in the postage meter that affixed indicia 36. The manner in which security code 89 and tracking number 7 are obtained is disclosed in the Sansone et al U.S. Pat. No. 4,831,555 entitled "Unsecured Postage Applying System" herein incorporated by reference.

Figure 4:
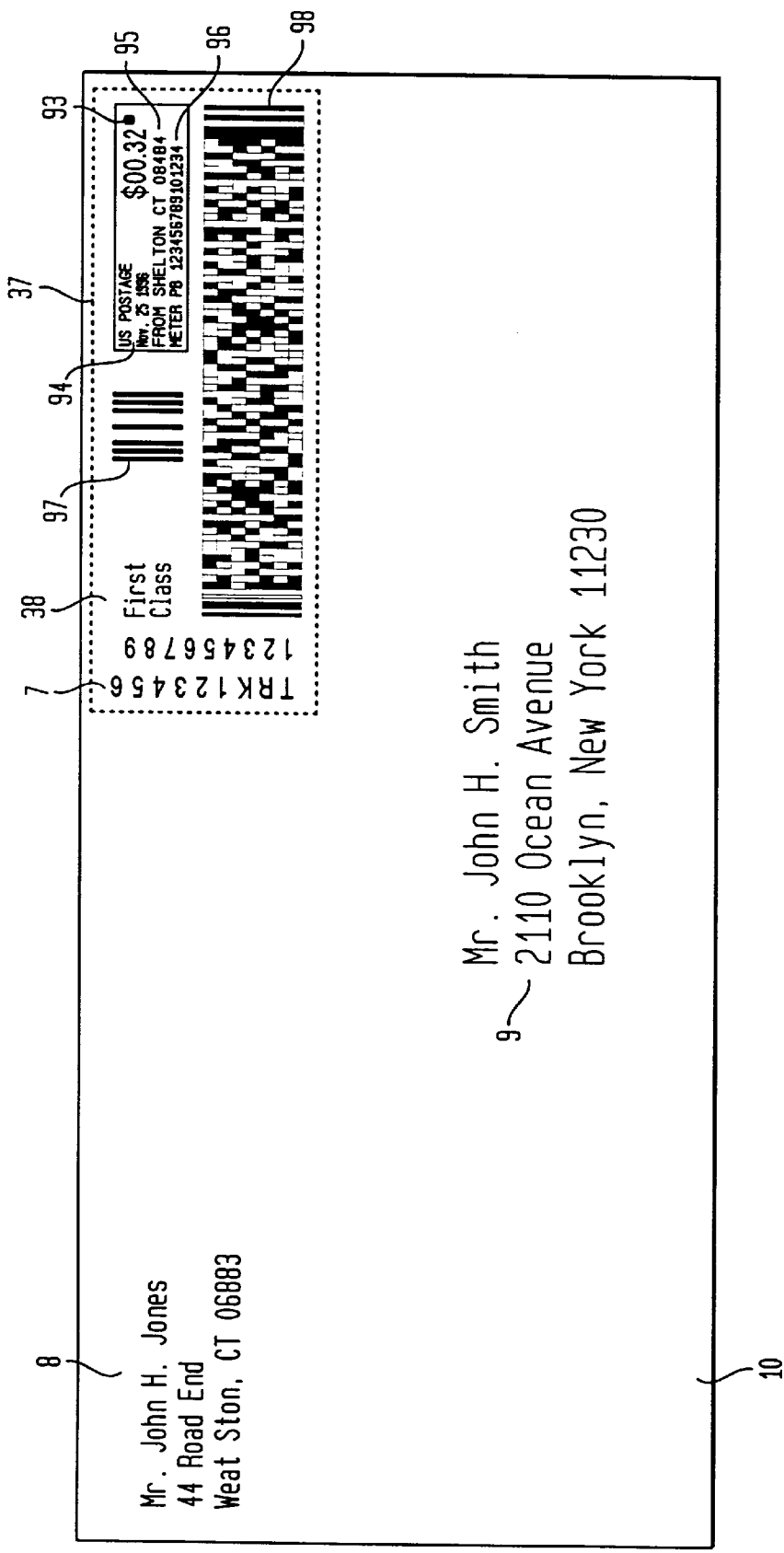
FIG. 4 is a drawing of a mail piece containing a Information-Based Indicia.

FIG. 4 is a drawing of a mail piece 10 containing an indicia 37. Mail piece 10 has a recipient address field 9 and a sender address field 8. Mail piece 10 contains USPS Information-Based Indicia (IBI) 37. The United States Postal Service Engineering Center recently published a notice of proposed specification that describes a Information Based Indicia. The postal indicia 37 contains a dollar amount 93, the date 94, that the postal indicia was affixed to mail piece 10, the place 95 that mail piece 10 was mailed, the postal security device serial number 96, a FIM code 97; a 2D encrypted bar code 98; and a tracking number 7. Serial number 96 may be derived from bar code 98 or be equal to bar code 98. Bar code 98 is a unique number that is derived from address field 9 and information contained in the postal security device that affixed IBI 37. The manner in which information contained in bar code 98 is obtained is disclosed in the Sansone, et al. U.S. Pat. No. 4,831,555 entitled "UNSECURED POSTAGE APPLYING SYSTEM," herein incorporated by reference. Mail piece 10 also contains an indication 38 of the class of mail piece 10.

Figure 5:
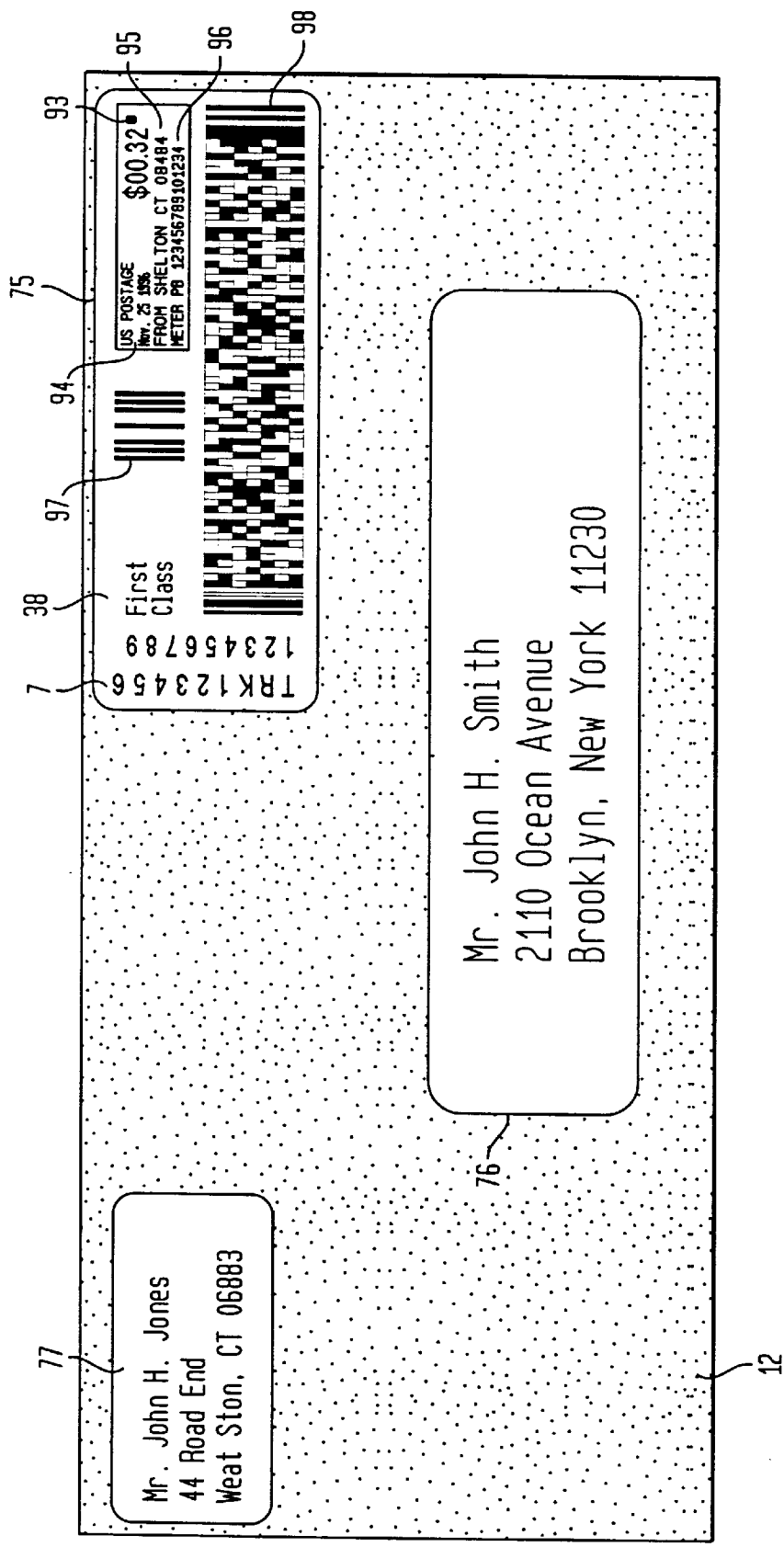
FIG. 5 is a drawing of a mail piece containing an envelope in which the indicia, senders address, recipient address were printed on labels that were affixed to the envelope or on a piece of paper that can be seen through the envelope.

FIG. 5 is a drawing of a mail piece containing an envelope in which the indicia, sender's address and recipient address were printed on labels that were affixed to the envelope or on a piece of paper that can be seen through the envelope. FIG. 5 is the same as FIG. 4 except that the return address field 8 is printed on a label 77, indicia 37 is printed on a label 75 and recipient address field 9 is printed on a label 76. Return address field 8, indicia 37, recipient address field 9 may be also printed on paper so that they may be seen through envelope 78.

Figure 6:
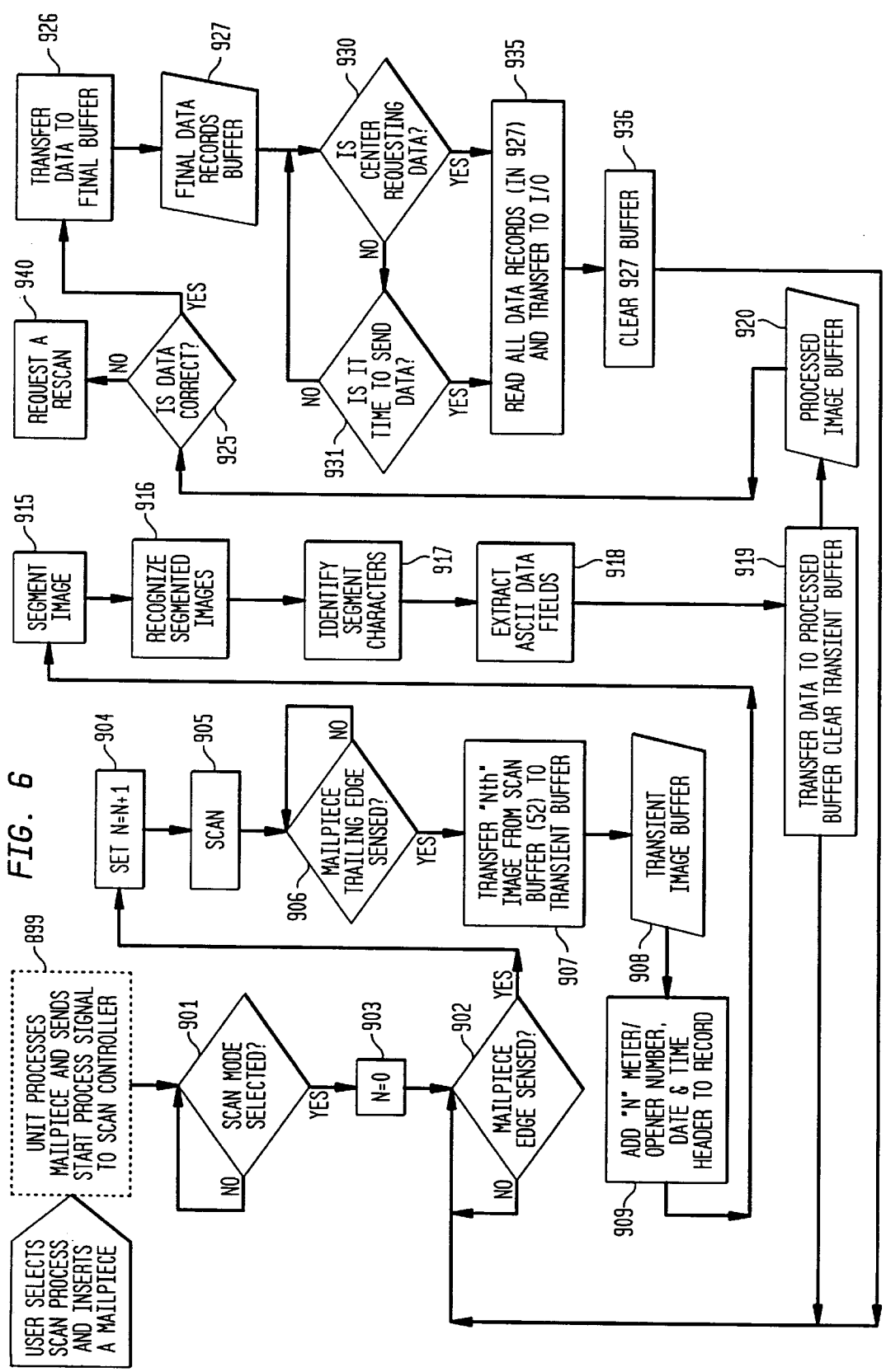
FIG. 6 is a drawing of a flow chart of the scan/upload process.

FIG. 6 is a drawing of a flow chart of the scan/upload process for the meter and the PSD. The user selects the scan process and inserts a mail piece for the meter. For the receiving PSD 342 (FIG. 8), the user selects the scan process and inserts a mail piece into scanner 345. Block 899 processes the mail piece and sends a start process signal to the scan controller. This process is used by meter controller 46 of FIG. 1. Then the program goes to block 901 and processes the mail piece as a conventional meter would. Block 901 determines whether or not the scan mode has been selected. If the scan mode has not been selected, then the program goes back to block 901. If the scan mode has been selected, the program goes to block 903 and sets N=0. Then the program goes to decision block 902. Block 902 determines whether or not the edge of mail piece 10 has been sensed. If the edge of mail piece 10 has not been sensed, then the program goes back to block 902. If the edge of mail piece 10 has been sensed then the program goes to block 904, where N is a piece count of the image of a mail piece.

Now the program goes to block 905 to scan mail piece 10. At this point the program goes to decision block 906. Block 906 determines whether or not the trailing edge of mail piece 10 has been sensed. If the trailing edge of mail piece 10 has not been sensed, then the program goes back to block 906.

If the trailing edge of mail piece 10 has been sensed, the program goes to block 907. Block 907 transfers the Nth image from the scan buffer block 52 (FIG. 2) to the transient image buffer block 908. Then the program goes to goes to block 909 to add N, the piece count of the image of the mail piece, meter number, date and time to the header for the record. Then the program goes to block 915 to segment the image. Then the program goes to block 916 to recognize segmented images. In block 917, the program identifies the segmented characters. Now the program goes to block 918 to extract ASCII data fields. At this point, the program goes to block 919 to transfer the data to processed buffer block 920 and clear transient buffer block 908. Now the program goes to decision block 902 and to processed image buffer block 920. Then the program goes to decision block 925. Block 925 determines whether or not the data is correct. If the data is incorrect, the program goes to block 940 to request a rescan. If the data is correct, the program goes to block 926 to transfer the data to the final buffer. Then the program goes to block 927, the final data records buffer. At this point, the program goes to decision block 930. Decision block 930 determines whether or not data center computer 26 is requesting data. If block 930 determines that computer 26 is not requesting data, then the program proceeds to decision block 931. Decision block 931 determines whether or not it is time to send data. If block 931 determines that it is not time to send data, the program goes back to block 930. If block 931 determines that it is time to send data, the program goes to block 935. Block 935 reads all final data records in block 927 and transfers them to I/O 56, 57 or 63.

Now the program goes to block 936 to clear final data buffer records block 927. Then the program goes back to decision block 902. If block 930 determines that computer 26 is requesting data, then the program proceeds to block 935. Block 935 reads all final data records in block 927 and transfers them to I/O 56, 57 or 63.

Figure 7A:
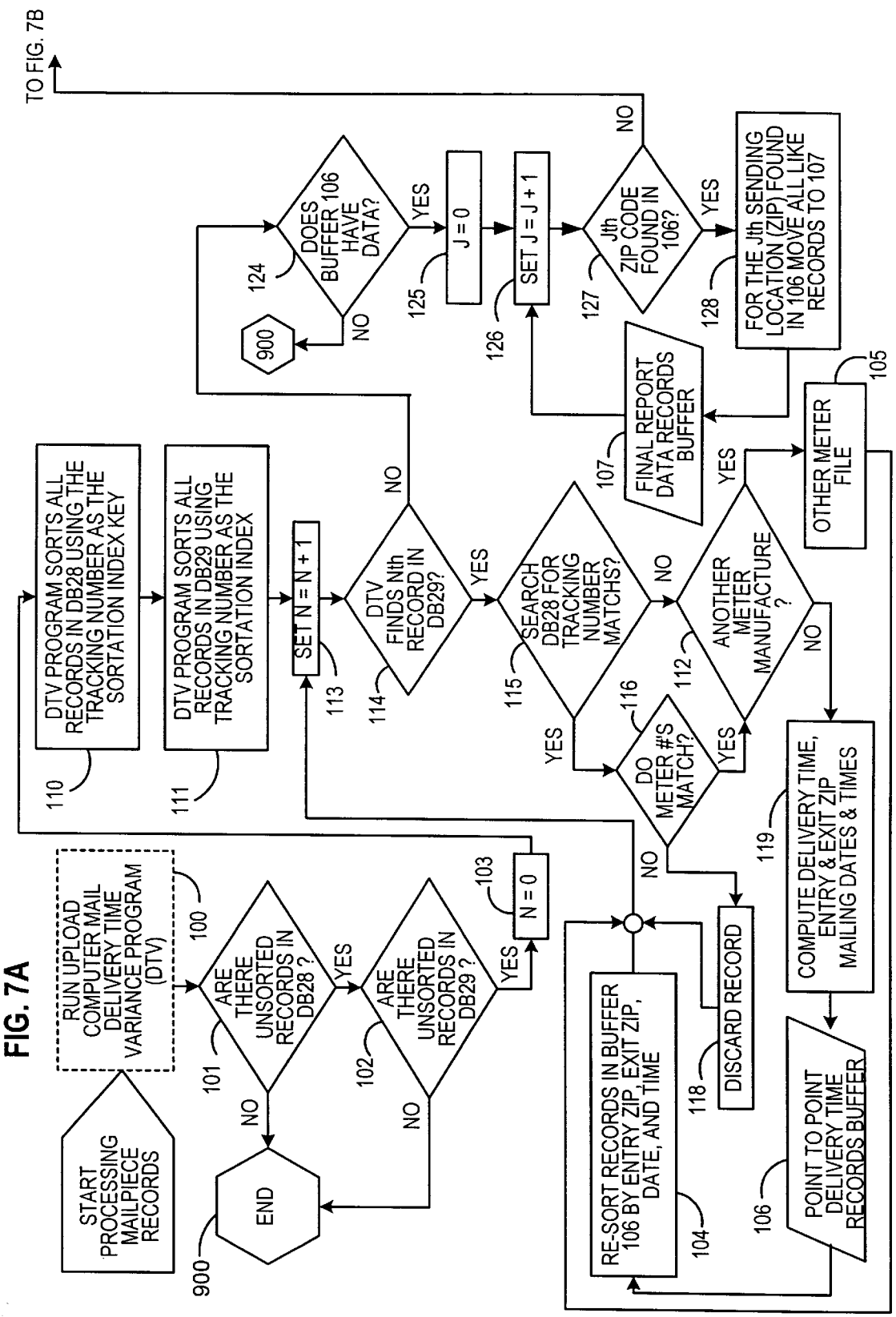
FIGS. 7A and 7B is a drawing of a flow chart of the data center process for identifying delays for deliverable mail and for generating reports.
Figure 7B:
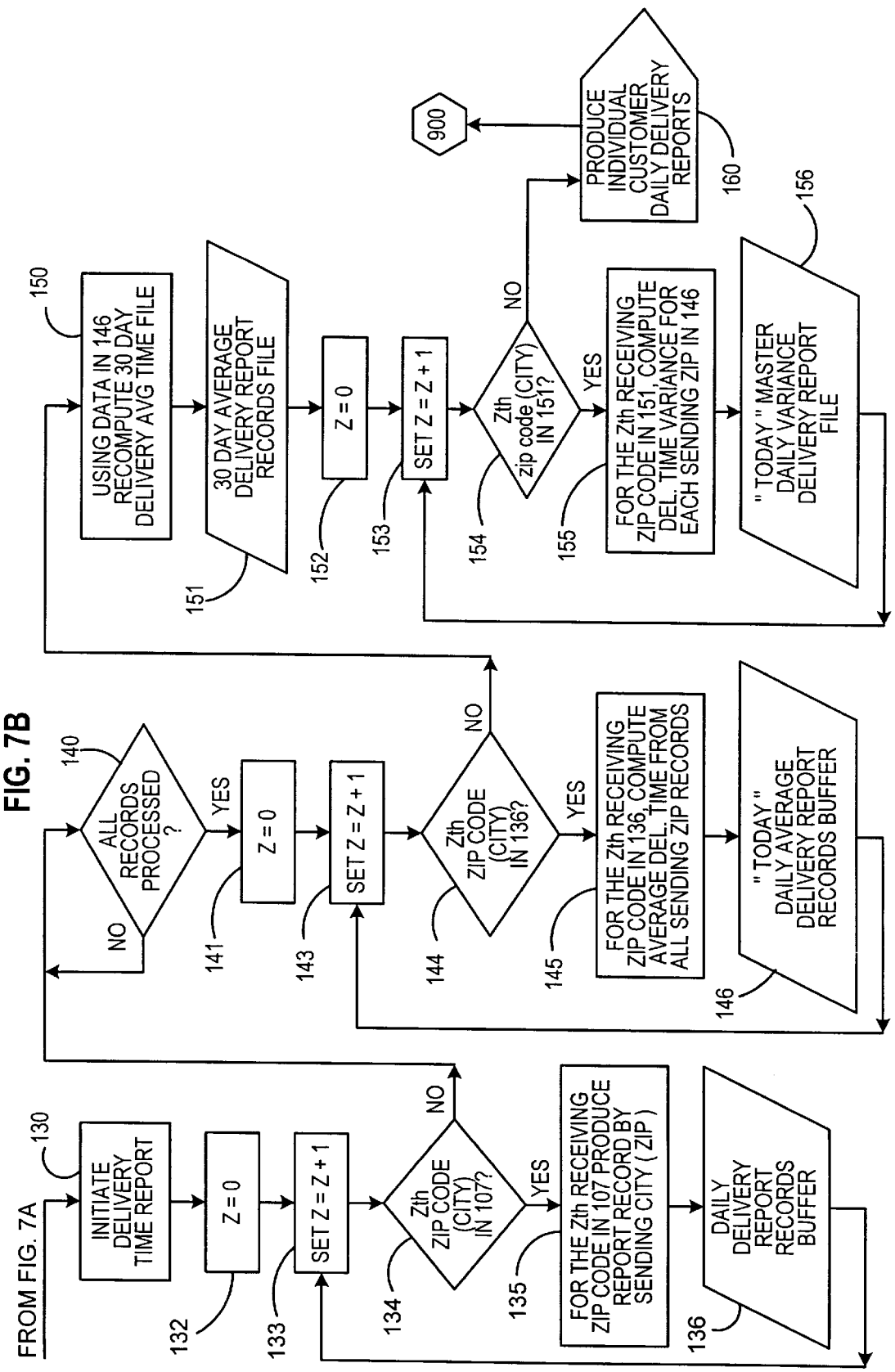

FIGS. 7A and 7B is a drawing of a flow chart of the data center process for identifying delays for deliverable mail and for generating reports. The program starts in block 100 of FIG. 7A by running the upload computer mail delivery time variance program. Then the program goes to block 101 to determine whether or not there are any unsorted records in outbound mail data buffer 28 (FIG. 1). If there are no unsorted records in buffer 28, the program goes to block 900 and ends. If block 101 determines that there are unsorted records in buffer 28, the program proceeds to decision block 102. Decision block 102 determines whether or not there are any unsorted records in inbound mail data buffer 29 (FIG. 1). If there are no unsorted records in buffer 29, the program goes to block 900 and ends. If block 102 determines that there are unsorted records in buffer 29, the program proceeds to block 103 to set N=0. Now the program goes to block 110 to sort all records in buffer 28, using tracking number 7 as the sortation index. Now the program goes to block 111 to sort all the records in buffer 29, using tracking number 7 as the sortation index. At this point, the program goes to block 113 to set N=N+1. Now the program goes to decision block 114 to select the Nth record in buffer 29. The first time through block 114, the program will select the first record. If there are no records in buffer 29, then the program goes to decision block 120. If there are records in buffer 29, the program goes to decision block 115. Decision block 115 searches inbound mail data buffer 28 and determines whether or not it found the first tracking number match.

If decision block 115 determines that there are no ID numbers that match in buffer 29, then the program goes to decision block 112. Decision block 112 determines whether or not the postal indicia on mail piece 10 was affixed by a different manufacturer than the manufacturer of meter 11 or PSD 312.

If block 112 determines that the indicia on mail piece 10 was affixed by a different meter or PSD manufacturer, then the program goes to block 105 other meter file. Then the program goes to block 113. If block 112 determines that the indicia on mail piece 10 was affixed by the same meter or PSD manufacturer, then the program goes to block 119. Block 119 computes the delivery time entry and exit, zip code, mailing dates and times. Then the program goes to block 106, where the point to point delivery time records are stored. Now the program goes to block 104 to re-sort the records in buffer 106 by entry zip code, exit zip code, date and time. Then the program loops back to block 113.

If decision block 115 finds the first tracking number match in buffer 28, then the program goes to block 116. Decision block 116 determines whether or not the meter number or PSD number contained in each tracking number is the same. If block 116 determines that the meter number contained in each tracking number is not the same, then the program goes to block 118 and discards the record.

Then the program goes back to block 113. If block 116 determines that the meter number or PSD number contained in each tracking number is the same then the program goes to decision block 112. Block 112 determines whether or not the postal indicia on mail piece 10 was affixed by a different manufacturer than the manufacturer of meter 11 or PSD 312. If block 112 determines that another meter manufacturer or PSD manufacturer affixed the indicia to mail piece 10, then the program goes to block 105 other meter file. Then the program goes to block 113 to set N=N+1. If decision block 114 was unable to find the Nth record in buffer 29, the program goes to decision block 124. Decision block 124 determines whether or not buffer 106 has data. If block 124 determines that buffer 106 has no data, the program goes to block 900 and ends. If block 124 determines that buffer 106 has data, the program goes to block 125 to set J=0, where J is a record number.

Now the program goes to block 126 to set J=J+1. Then the program goes to decision block 127. Decision block 127 determines whether or not the Jth meter number or PSD number zip code was found in block 106. If block 127 determines that the Jth number was found, the program goes to block 128. For the Jth sending location zip code found in block 106, block 128 sends these records to block 107. Block 107 compiles a final report of the data record buffer. Then the program goes back to block 126 to set J=J+1.

If decision block 127 did not find the Jth number zip code in block 106, the program goes to block 130 (FIG. 7B). Block 130 initiates a delivery time report. Now the program goes to block 132 to set Z=0, where Z is the zip code. Then the program proceeds to block 133 to set Z=Z+1. Now the program goes to decision block 134. Decision block 134 determines whether or not the Zth zip code is in block 107. If the Zth zip code is in block 107, the program goes to block 135. For the Zth receiving zip code in block 107, block 135 produces a report record by sending city or sending zip code. Then the program goes to block 136, the daily delivery reports records buffer. At this point the program goes back to block 133 to set Z=Z+1.

If block 134 determines that the Zth zip code is not in block 107, the program goes to decision block 140. Decision block 140 determines whether or not all records have been processed. If block 140 determines that all records have not been processed, the program goes back to the input of block 140. If block 140 determines that all the records have been processed, the program goes to block 141 to set Z=0. Then the program goes to block 143 to set Z=Z+1. Now the program goes to decision block 144.

Decision block 144 determines whether or not the Zth zip code or city is in block 136. If block 144 determines that the Zth zip code or city is in block 136, the program goes to block 145. For the Zth receiving zip code or city in block 136, block 145 computes an average delivery time for all sending zip code records. Then the program goes to block 146 "today" daily average delivery report records buffer.

Now the program goes back to block 143 to set Z=Z+1. If block 144 determines that the Zth zip code or city is not in block 136, the program goes to block 150. Block 150 uses the data in block 146 to re-compute the thirty day average time file. Then the program goes to block 151 to prepare the thirty day average delivery report records file.

Then the program goes to block 152, where Z=0. Now the program goes to block 153 to set Z=Z+1. At this point, the program goes to decision block 154 to determine whether or not the Zth zip code or city is in block 151. If block 154 determines that the Zth zip code or city is in block 151, the program goes to block 155. For the Zth receiving zip code in block 151, block 155 computes a delivery time variance for each sending zip code and city in block 146. Now the program goes to block 156 to store the values computed in block 155 in the day master daily variance delivery report file.

If block 154 determines that the Zth zip code or city is not in block 151, the program goes to block 160. Block 160 produces individual customer daily delivery reports. After block 160 produces the aforementioned reports, the program goes to block 900 and ends.

Figure 8:
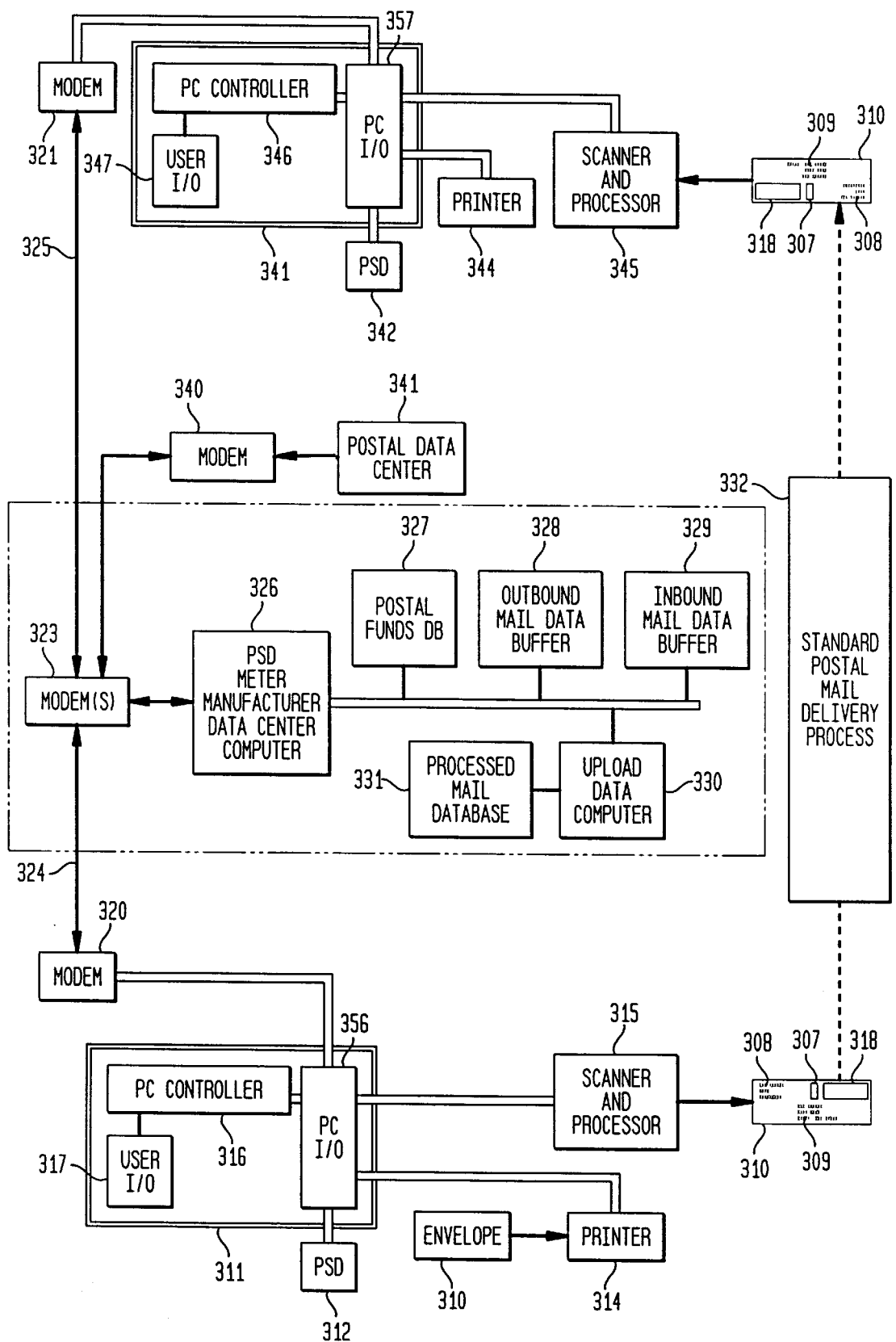
FIG. 8 is a block diagram of a PSD based PC mailing system.

FIG. 8 is a block diagram of a PSD based PC mailing system. Personal computer (PC) 311 includes: a PC controller 316; a user I/O 317; and a PC I/O 356. PSD 312 obtains a security code that may be obtained from address field 309 of mail piece 310 and information contained in PC 311. User I/O 317 comprises a keyboard in which an operator may enter information into PC 311 and a display in which a operator of PC 311 may read information about PC 311. A clock and calendar inside PSD 312 will supply the instant date and time that printer 314 affixed the indicia to mail piece 310. Scanner and processor 315 will store the above information in PC 311.

Actions performed by PC 311 are communicated to controller 316. Controller 316 controls the actions of PC 311. Controller 316 uses the weighing of the mail piece to determine the correct postage, and causes printer 314 to affix the correct postage to mail piece 310.

The user of PC 311 places the mail piece to be mailed on a scale (not shown) and enters the classification of the material to be mailed, i.e., first class mail, second class mail, parcel post, etc. into the keyboard of I/O 317 and relevant information regarding the object to be mailed is displayed on the display of I/O 317.

Printer 314 will print postal indicia 318 on mail piece 310. Scanner and processor 315 scans address field 309 and sender return address field 308 of mail piece 310. Then scanner and processor 315 segments the information contained in fields 308 and 309 and stores the segmented information, i.e., tracking code 307. Tracking code 307 may be similar to or the same as the security code determined by PSD 312. It will be obvious to one skilled in the art that there are many different methods to produce unique tracking numbers.

I/O 356 is coupled to modem 320 and scanner and processor 315. Modem 323 is coupled to modem 320 via communications path 324 and modem 321 is coupled to modem 323 via communications path 325. Modem 323 is coupled to PSD data center computer 326. Computer 326 manages the day to day operation of its PSDs metering, i.e., installing new PSDs, withdrawing PSDs, and refilling PSDs with customer funds.

Computer 326 is coupled to: postal funds data base 327. Data base 327 stores postal funds that have been used and credited to PC 311 and 341. Outbound mail data buffer 328 receives information about mail piece 310 from PC 311, i.e., tracking number 307 and address field 309. Inbound mail buffer 329 receives information about mail piece 310 from PC 341, i.e., tracking number 307 and address field 309. Upload data computer 330 receives and processes information from buffers 328 and 329. Processed mail data base 331 is coupled to upload data computer 330. Processed mail data base 331 stores the result of the output of computer 330 and makes it available to computer 326 for transmission to PC 311.

PC 341 includes: a PC controller 346; user I/O 347; and PC I/O 357. PSD 342 is coupled to PC I/O 357. PC I/O is coupled to modem 321 and modem 321 is coupled to modem 323 via path 325. Scanner and processor 345 is coupled to PC I/O 357 and printer 344 is coupled to PC I/O 357. PSD 342 will supply the instant date and time that scanner 345 reads mail piece 310. The above information will be stored in PC 311.

Thus, PC 341 is the same as PC 311. In this example, PC 341 is being used as the receiving PC and PC 311 is being used as a sending PC. It will be obvious to those skilled in the art that PC 311 may be a receiving PC and PC 341 a sending PC and that additional PCs may be connected to computer 326. Modem 340 is coupled to modem 323 which is coupled to postal data center 341 so that information from upload data computer 330 may be transmitted to postal data center 341. Upload data computer 330 may inform postal data center 341 of unexpected delivery delays in the mail delivery network and charge the mailer and/or the post for informing the mailer of the unexpected delivery delays in the mail delivery network.

After indicia 318 is affixed to mail piece 310 by PC 311, mail piece 310 is delivered to the post and enters USPS mail delivery process 332. The post delivers mail piece 310 to the owner of PC 341. Mail piece 310 will be scanned by scanner and processor 345 of PC 341. Scanner and processor 345 segments the data and stores it for uploading to computer 326 via modems 321 and 323. Information from PC 311 regarding mail piece 310 was previously sent to computer 326 via modems 320 and 323. The information transmitted by PC 311 includes tracking number 307 and address field 309. The information transmitted by PC 341 includes tracking number 307 and address field 309, the date and time mail piece 310 was scanned by PC 341 and the serial number of PC 341. It would be obvious to one skilled in the art that information transmitted between I/O 356 and computer 326 and information transmitted between I/O 357 and computer 326 may be encrypted to ensure the privacy of the information.

Figure 9:
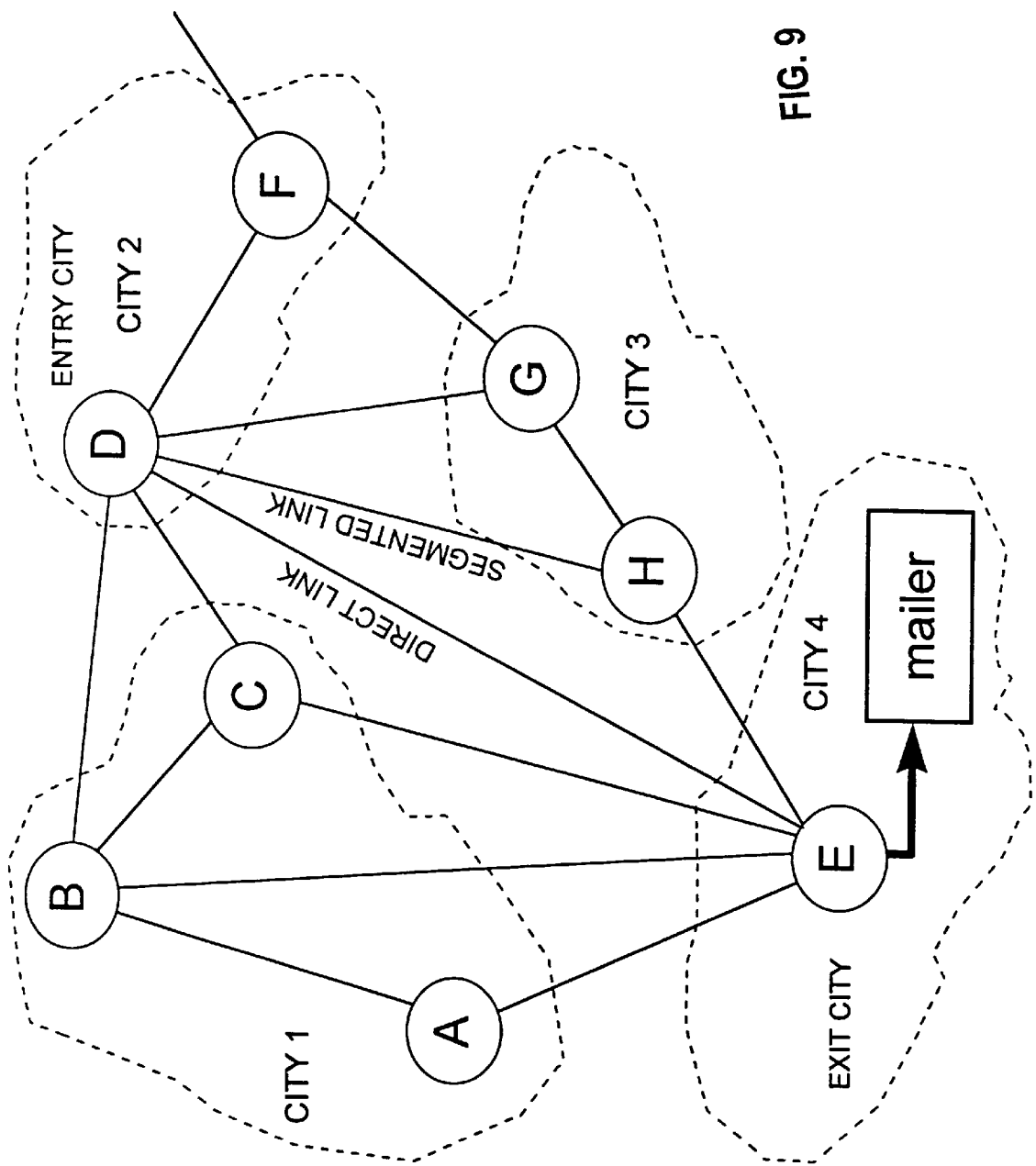
FIG. 9 is a drawing of a mail delivery network for various zip codes.

FIG. 9 is a drawing of a mail delivery network for zip codes A–H. Direct mail links exists between zip codes: A and B; A and E; B and C; B and D; B and E; C and D; C and E D and F; D and G; D and H; D and E; F and G; G and H and H and E. Segmented links DHE, DGHE, DFGHE, DBAE, DCE, DBCE, and DBE exist between entry zip code D and mailer zip code E. It will be obvious to one skilled in the art that many segmented links exits between the various zip codes and only the more direct links are normally employed by postal services. Zip codes A, B and C are in city 1 and zip codes D and F are in city 2. Zip codes G and H are in city 3 and zip code E is in city 4.

FIG. 10 is an individual customer's daily delivery report showing the delivery transit variance time for mail delivered to zip code E within city 4 from various zip codes located in cities 1, 2 and 3.

The above specification describes a new and improved system for determining unexpected delivery delays in the mail delivery network. It is realized that the above description may indicate to those skilled in the art additional ways in which the principles of this invention may be used without departing from the spirit. It is, therefore, intended that this invention be limited only by the scope of the appended claims.

What is claimed is:

1. A incoming mail monitoring system, said system comprises:

a plurality of mailers units that stores unique information contained in a postal indicia of a mail piece;

means for transmitting the mailers unique information;

a plurality of recipient addressee units that reads and stores the unique information contained in the postal indicia after the mail piece has been delivered to the recipient;

means for transmitting the recipients unique information;

a data center that receives the unique information stored by the mailers units and the recipients units; and means within the data center for comparing the unique mailer unit information and the unique recipient unit information to determine unexpected delivery delays in a mail delivery network.

2. The system claimed in claim 1, wherein the mailers units includes a scanner that reads the postal indicia.

3. The system claimed in claim 2, wherein the scanner verifies the unique information contained in the postal indicia.

4. The system claimed in claim 3, wherein the scanner produces a record indicating that a specific indicia was produced.

5. The system claimed in claim 1, wherein the mailers unit correlates the mail piece recipient address with unique information contained in the postal indicia.

6. The system claimed in claim 1, wherein the recipients unit includes a scanner that reads the postal indicia.

7. The system claimed in claim 1, wherein the mailers unit includes the time and date that the postal indicia was affixed to the mail piece in the unique information contained in the postal indicia.

8. The system claimed in claim 7, wherein the recipients unit stores the time and date that the recipient unit read the postal indicia.

9. The system claimed in claim 8, wherein the mailers unit includes other information regarding the mail piece in the unique information contained in the postal indicia.

10. The system claimed in claim 9, wherein the recipients unit reads the unique information contained in the postal indicia.

11. The system claimed in claim 10, wherein the data center further includes: means for comparing the unique information received from the mailers unit with the unique information received from the recipients unit.

12. The system claimed in claim 10, wherein the data center further includes: means for processing other information received from the mailers unit with information received from the recipients unit.

13. The system claimed in claim 9, wherein the data center further includes: means for informing the mailer of unexpected delivery delays in the mail delivery network.

14. The system claimed in claim 11, wherein the data center further includes: means for informing a post office of unexpected delivery delays in the mail delivery network.

15. The system claimed in claim 9, wherein the data center further includes: means for charging the mailer for informing the mailer of unexpected delivery delays in the mail delivery network.

16. The system claimed in claim 9, wherein the data center further includes: means for charging a post office for informing the mailer of unexpected delivery delays in the mail delivery network.

17. The system claimed in claim 1, wherein the mailers unit includes means for automatically transmitting the unique information to the data center at predetermined intervals.

18. The system claimed in claim 1, wherein the recipients unit includes means for automatically transmitting the unique information to the data center at predetermined intervals.

19. The system claimed in claim 1, wherein the data center further includes: means for sorting the unique information received from each of the mailers units by the mailers unit that sent the information.

20. The system claimed in claim 19, wherein the data center further includes: means for sorting the information received from each of the recipient units by the recipient unit that sent the information.

21. The system claimed in claim 1, wherein the unique information is encrypted.

22. The system claimed in claim 1, wherein the unique information is printed in an area other than the indicia area of the mail piece.

23. The system claimed in claim 1, wherein the mailers units are digital postage units.

24. The system claimed in claim 1, wherein the mailers units are digital processors.

25. The system claimed in claim 1, wherein the recipients units are digital postage units.

26. The system claimed in claim 1, wherein the recipients units are digital processors.

27. The system claimed in claim 1, wherein the unique information transmitted between the recipients units and the data center are encrypted.

28. The system claimed in claim 1, wherein the unique information transmitted between the mailers units and the data center are encrypted.

* * * * *